(12) United States Patent
Todani et al.

(10) Patent No.: US 7,573,653 B2
(45) Date of Patent: Aug. 11, 2009

(54) INNER FOCUSING ZOOM LENS BARREL

(75) Inventors: Satoshi Todani, Saitama (JP); Atsushi Shimane, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 12/007,208

(22) Filed: Jan. 8, 2008

(65) Prior Publication Data
US 2008/0198480 A1 Aug. 21, 2008

(30) Foreign Application Priority Data
Feb. 16, 2007 (JP) ............................. 2007-036517

(51) Int. Cl.
G02B 15/14 (2006.01)
(52) U.S. Cl. .................... 359/699; 359/700
(58) Field of Classification Search ......... 359/694–704, 359/823–826; 348/75, 335, 340, 357; 396/72, 396/79, 349
See application file for complete search history.

(56) References Cited

U.S. PATENT DOCUMENTS

| | | | |
|---|---|---|---|
| 6,754,011 B2 | 6/2004 | Todani | |
| 7,321,471 B2 * | 1/2008 | Kuroki | ........................ 359/699 |
| 7,515,355 B2 * | 4/2009 | Todani et al. | ................ 359/701 |

FOREIGN PATENT DOCUMENTS

| | | |
|---|---|---|
| JP | 08-304684 | 11/1996 |
| JP | 2000-089086 | 3/2000 |
| JP | 2003-279835 | 10/2003 |

* cited by examiner

*Primary Examiner*—Loha Ben
(74) *Attorney, Agent, or Firm*—Jacobson Holman PLLC

(57) ABSTRACT

The present invention is directed to an inner focusing zoom lens barrel provided with cams of a well-balanced configuration for smooth zooming and/or focusing operations, which attains sufficient performances at the minimum object distance, which is capable of inhibiting a focal length from varying throughout the entire zoom range, and which has a reduced outer diameter. The inner focusing zoom lens barrel has a fixed barrel, first and second cam barrels, a linear-shuttle barrel, a focusing cam barrel, a zooming relay barrel, and a 1st-lens-group sliding barrel, characterized in that the first cam barrel, the linear-shuttle barrel, and the focusing cam barrel are superposed one over another in this sequence inside the fixed barrel while the zooming relay barrel, the second cam barrel, and the 1st-lens-group sliding barrel are superposed one over another in this sequence outside the fixed barrel. The first cam barrel is formed with 3rd- and 4th-lens-group guiding cams, the linear-shuttle barrel is formed with 2nd-lens-group guiding cams, the zooming relay barrel is formed with 1st-cam-barrel guiding cams, the second cam barrel is formed with 1st-lens-group guiding cams, and the focusing cam barrel is formed with 2nd-lens-group focusing/guiding grooves and 2nd-lens-group guiding grooves.

3 Claims, 11 Drawing Sheets

INNER FOCUSING ZOOM LENS BARREL

FIELD OF THE INVENTION

The present invention generally relates to a zoom lens barrel, and more particularly, it relates to an inner focusing zoom lens barrel suitable for inner focusing zoom lens having an attainable zoom ratio of approximately ×14.

BACKGROUND ART

In some high power inner focusing zoom lens, a displacement of a focusing lens during the photographing at the minimum object distance is greatly varied depending upon a zoom ratio, and hence, even if an attempt to enhance a photographing performance at the minimum object distance within a single stroke of focusing cams is successful in one of zooming ranges, this resultantly causes the displacement of the focusing lens being elongated in the remaining zoom ranges, which brings about the so-called "varying focal" length. For focusing cam curves that are used for transition between a varying-focal-length fixing range and the zooming range, zooming parameters and focusing parameters are determined for their appropriate distribution. This causes a difficulty in ensuring a sufficiently balanced cam configuration to conduct a smooth zooming-focusing transition, resultantly necessitating to alter a rotation angle of the focusing cams or to compensate for transforming motion by the focusing cam.

In some prior art high power zoom lens, a focusing lens is simultaneously angularly and linearly moved in both the cases of the zooming and the focusing. Since guide grooves defined in a focusing cam barrel are configured so as to work as cams suitable to rotate the focusing lens, manipulation pins fitted in the guide grooves slide in and along the guide grooves in the focusing cam barrel during the zooming so as to rotate the focusing lens, and thus, a zooming manipulation permits the focusing lens to alter its direction to rotate so that a working zone with the focusing cams is shifted, thereby appropriately displace the focusing lens in any of the zooming ranges (see Patent Document 1 listed below).

However, it is still hard to ensure a sufficient displacement of the focusing lens to enhance the photographing performance at the minimum object distance and/or to inhibit from varying a focal length throughout the entire zoom range. Some other prior art zoom lens of high power not more than ×5 is of five-layer assembly where a first cam barrel is disposed inside a fixed barrel while a second cam barrel, a linear-shuttle barrel, and, a third cam barrel are located outside the fixed barrel and such a zoom lens has a drawback that its outer diameter cannot be reduced any further.

In other prior art high power zoom lens, focus correcting cams are located in the same rotary member as the focusing cams are, thereby attaining an appropriate displacement of the focusing cams (see Patent Document 2 listed below). With this mechanical design where the focusing lens is linearly displaced during the zooming, however, a fixed corrected displacement is applied in any of the zooming ranges, and this fixed corrected displacement makes it inappropriate to further shorten the minimum object distance in any of the zooming ranges for the high power zoom lens. Additionally, the high power zoom lens is also of five-layer assembly where first and second cam barrels, a linear-shuttle barrel, and a third cam barrel are disposed outside a fixed barrel, and such a zoom lens is disadvantageous in that its outer diameter cannot be reduced any further.

Some other prior art high power zoom lens, as shown in FIGS. 10 and 11, is comprised of a zooming relay ring 14 inside a fixed barrel 12, a first cam barrel 16 inside the zooming relay ring 14, and a focusing cam barrel 20 inside a linear-shuttle barrel 18 further inside the first cam barrel 16. The first cam barrel 16 is coupled to the zoom relay ring 14 with zooming relay studs 40 intervening therebetween, so that rotations of a zooming ring 30 are transmitted to the first cam barrel 16. The first cam barrel 16 includes 1st-cam-barrel guiding cams to fit on 1st-cam-barrel guiding studs 39 to slide the first cam barrel along the optical axis, 3rd-lens-group guiding cams to fit on 3rd-lens-group guiding studs 43, and 4th-lens-group guiding cams to fit on 4th-lens-group guiding studs 45. The first cam barrel 16 is also provided with 2nd-cam-barrel relay studs 50 that protrude outward ahead of the fixed barrel 12 and opposite to a lens mount 10. The 2nd-cam-barrel relay studs 50 are to fit in circumferential guiding grooves defined in the second cam barrel 22 (see Patent Document 3 listed below).

The above-mentioned high power zoom lens includes the zooming relay ring 14 inside the fixed barrel 12, the first cam barrel 16 inside the zooming relay ring 14, and the linear-shuttle barrel 18 inside the first cam barrel 16. The first cam barrel 16 is coupled to the zooming relay ring 14 with the zooming relay studs 40 intervening therebetween so that rotations of the zooming ring 30 are transmitted to the first cam barrel 16. In order to slide the first cam barrel 16 along the optical axis, the first cam barrel 16 must have its 1st-cam-barrel guiding cams fitted on the 1st-cam-barrel guiding studs 39, its 3rd-lens-group guiding cams fitted on the 3rd-lens-group guiding studs 43, and its 4th-lens-group guiding cams fitted on the 4th-lens-group guiding studs 45.

However, the first cam barrel 16 has its entire length restricted along the optical axis while the 1st-cam-barrel guiding cams, and the 3rd- and 4th-lens-group guiding cams are all defined in a layout with restrictions of their respective axial extensions imposed. Especially, for attaining a more enhanced zoom ratio, an axial displacement of third and fourth lens groups are to be greater, but it is hard to implement a well-balanced disposition of the guiding cams for these lens groups to be confined within the axial dimension available in the first cam barrel 16. More specifically, with an awkwardly constrained layout of the guide cams, more restrictions would be imposed on configurations and positions of the guide cams to leave only a captive room for design.

In addition, for the available entire length of the fixed barrel 12, a stroke of the linear-shuttle barrel 18 is elongated as the displacement of the third lens group becomes greater, and an amount by which the linear-shuttle barrel 18 is superposed on the fixed barrel 12 for the tele-photo shooting, namely, an overlapping segment is reduced so that the required stability of the lens barrel is no longer ensured.

Patent Document 1: Japanese Patent Unexamined Publication No. H8-304684

Patent Document 2: Japanese Patent Unexamined Publication No. 2000-89086

Patent Document 3: Japanese Patent No. 3689379

The present invention is made to overcome the aforementioned disadvantages of the prior art zoom lens barrels, especially, the prior art inner focusing zoom lens barrels, and accordingly, it is an object of the present invention to provide an improved inner focusing zoom lens barrel provided with cams of a well-balanced configuration for smooth zooming and/or focusing operations.

It is another object of the present invention to provide an improved inner focusing zoom lens barrel that attains a satisfactory photographing performance at the minimum object distance, that is capable of inhibiting a focal length from varying throughout the entire zoom range, and that has a reduced outer diameter.

It is still another object of the present invention to provide an improved inner focusing zoom lens barrel that has reduced restrictions on configurations and positions of guiding cams, that has a greater overlapping segment where a linear-shuttle barrel is superposed on a fixed barrel for the tele-photo shooting, so as to attain an enhanced stability.

SUMMARY OF THE INVENTION

The present invention is directed to an inner focusing zoom lens barrel having a fixed barrel, first and second cam barrels, a linear-shuttle barrel, a focusing cam barrel, a zooming relay barrel, and a 1st-lens-group sliding barrel, characterized in that the first cam barrel, the linear-shuttle barrel, and the focusing cam barrel are superposed one over another in this sequence inside the fixed barrel while the zooming relay barrel, the second cam barrel, and the 1st-lens-group sliding barrel are superposed one over another in this sequence outside the fixed barrel.

In an aspect of the present invention, the inner focusing zoom lens barrel is characterized in that the first cam barrel is provided with 3rd- and 4th-lens-group guiding cams, the linear-shuttle barrel is provided with 2nd-lens-group guiding cams, the zooming relay barrel is provided with 1st-cam-barrel guiding cams, the second cam barrel is provided with 1st-lens-group guiding cams, and the focusing cam barrel is provided with 2nd-lens-group focusing/guiding grooves and 2nd-lens-group guiding cams.

In another aspect of the present invention, the inner focusing zoom lens barrel is characterized in that the first cam barrel, the zooming relay barrel, and the second cam barrel are moved simultaneously rotationally about and axially along the optical axis during the zooming, and the focusing cam barrel is moved along the optical axis by rotation of the focusing cam barrel during the focusing.

The inner focusing zoom lens barrel according to the present invention effectively makes a difference to a barrel arrangement so that smooth zooming and focusing operations can be conducted by virtue of its well-balanced cam configurations.

The inner focusing zoom lens barrel according to the present invention also effectively makes a difference to the barrel arrangement so that sufficient performances at the minimum object distance is attained while a focal distance is inhibited from varying throughout the entire zoom range, and the barrel has its outer diameter reduced.

The inner focusing zoom lens barrel according to the present invention further effectively makes a difference to the barrel arrangement so that attained are reduced restrictions imposed on configurations and positions of guiding cams, a greater overlapping segment where a linear-shuttle barrel is superposed on a fixed barrel for the tele-photo shooting, and an enhanced stability.

DETAILED DESCRIPTIONS OF THE BEST MODE

The best mode of an inner focusing zoom lens barrel according to the present invention will now be described in conjunction with the accompanying drawings.

<Arrangement of the Lens Barrel>

Figure 1:
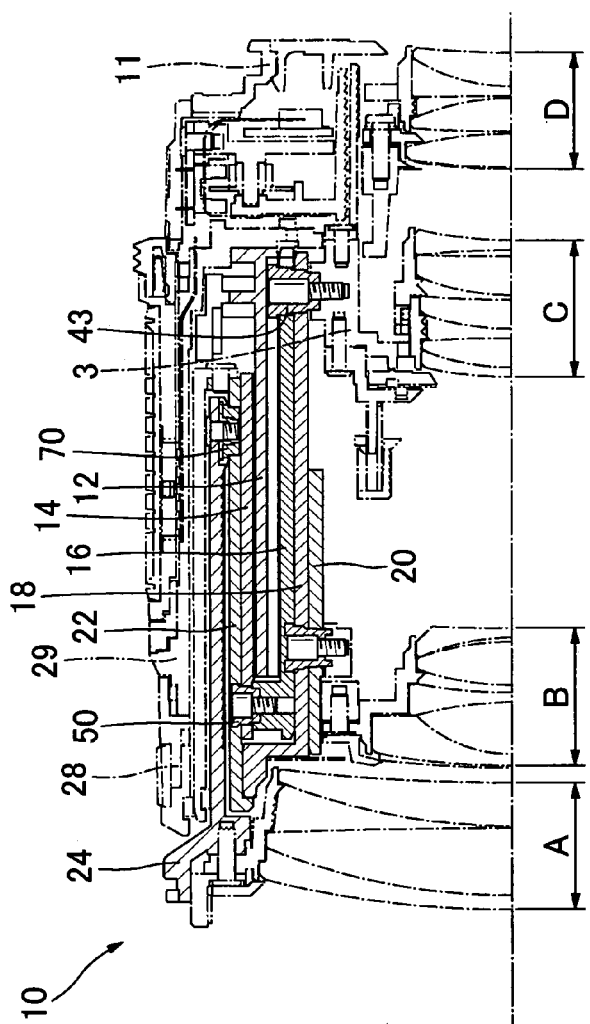
FIG. 1 is a partial cross-sectional view of an exemplary inner focusing zoom lens barrel according to the present invention, showing the zoom lens barrel in a wide-angle view posture.
Figure 2:
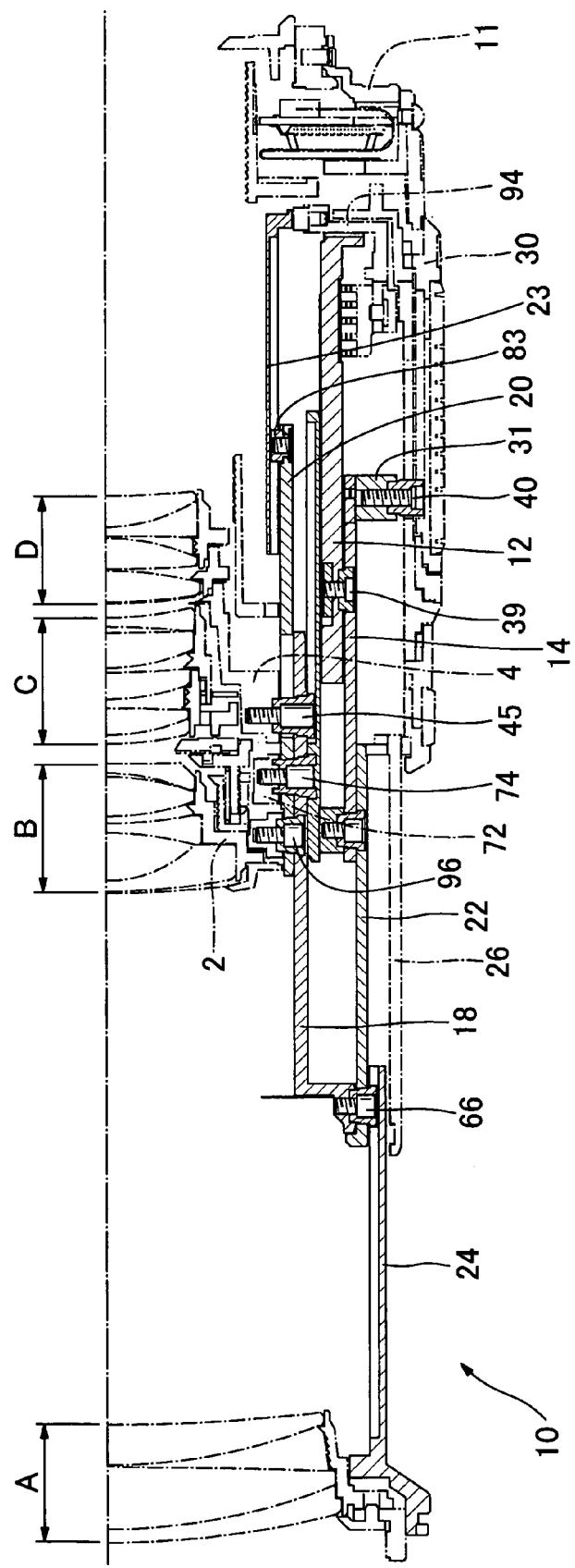
FIG. 2 is a partial cross-sectional view of the exemplary inner focusing zoom lens barrel according to the present invention, showing the zoom lens barrel in a tele-photo view posture.

An inner focusing zoom lens barrel 10 having a focal length of 18 mm to 250 mm houses a first lens group A (focal length of +95.5 mm), a second lens group B (focal length of −12.7 mm), a third lens group C (focal length of +43.7 mm), and a fourth lens group D (focal length of +46.2 mm), as shown in FIGS. 1 and 2. The zoom lens barrel 10 has a fixed barrel 12 that is integrated with a mount 11 used to attach to a camera body (not shown).

A first cam barrel 16 and a linear-shuttle barrel 18 inside the same are superposed over an inner surface the fixed barrel 12. Further inside the linear-shuttle barrel 18, a focusing cam barrel 20, a focusing relay ring 23, a 2nd-lens-group holder 2, a 3rd-lens-group holder 3, and a 4th-lens-group holder 4 are superposed one inside another in this sequence.

A zooming relay ring 14 and a second cam barrel 22 outside the same are superposed over an outer surface of the fixed barrel 12, and moreover, a 1st-lens-group sliding frame 24 is disposed outside them. An ornamental outer barrel 26, a zooming manipulation ring 30, an intermediate lens barrel 29 integrated with the fixed barrel 12, and a focusing manipulation ring 28 are outside the 1st-lens-group sliding frame 24, namely, exposed to the outside.

Figure 3:
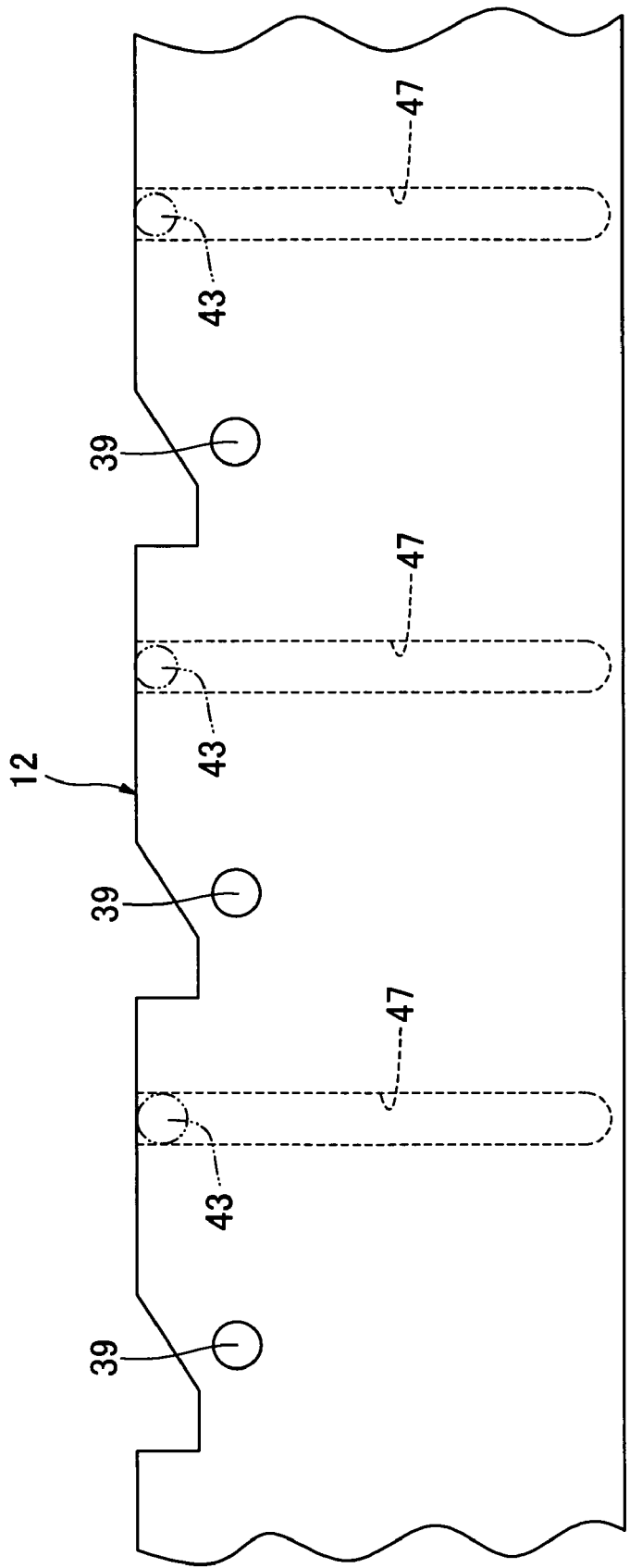
FIG. 3 is an exploded view of a fixed barrel for the embodiment of the present invention.

The fixed barrel 12 has its inner surface formed with linear guiding grooves 47 that are to fit on 3rd-lens-group guiding studs 43, as shown in FIG. 3.

Figure 4:
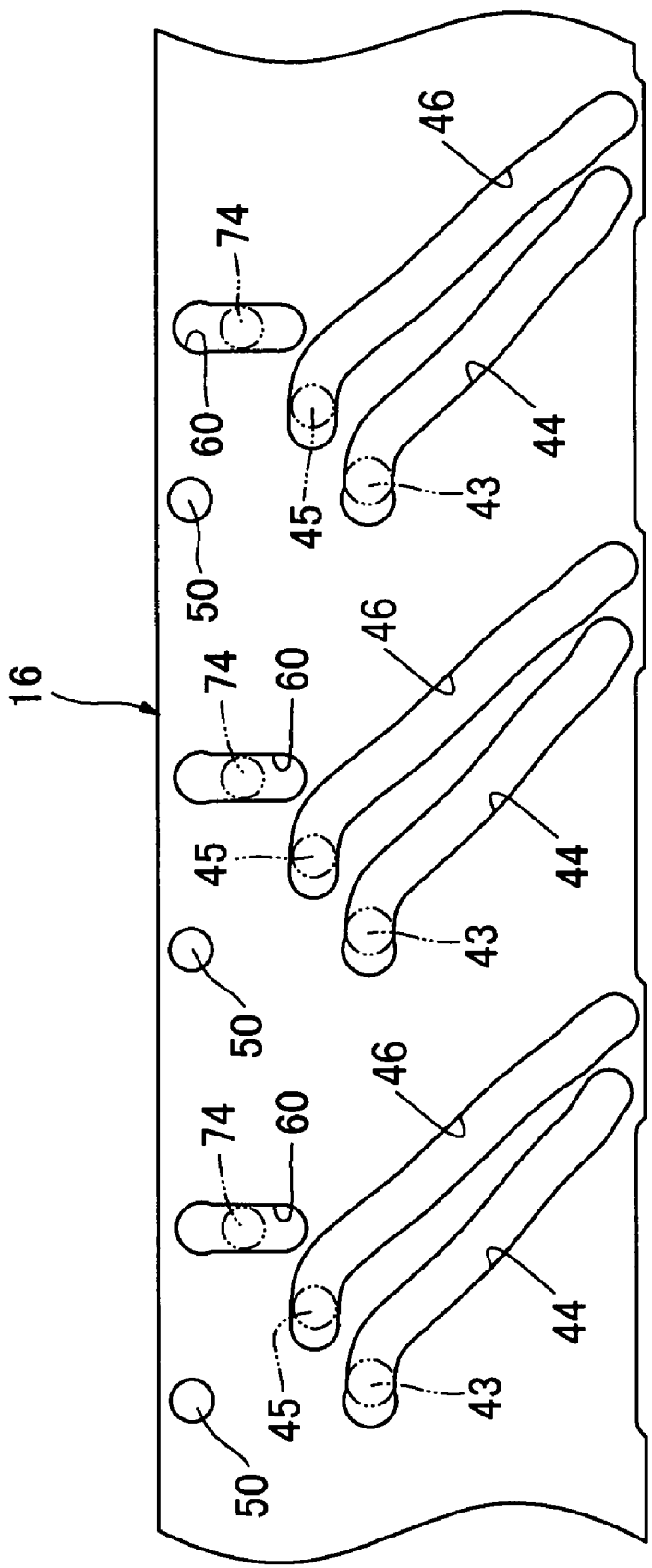
FIG. 4 is an exploded view of a first cam barrel for the embodiment of the present invention.

The first cam barrel 16 is, as shown in FIG. 4, formed with 3rd-lens-group guiding cams 44, 4th-lens-group guiding cams 46, and first circumferential guiding grooves 60 where the cams 44 are to fit on 3rd-lens-group guiding studs 43, the cams 46 are to fit on 4th-lens-group guiding studs 45, and the grooves 60 are to fit on 2nd-lens-group guiding studs 74. The first cam barrel 16 is further provided with zooming-relay-ring guiding studs 50.

Figure 5:
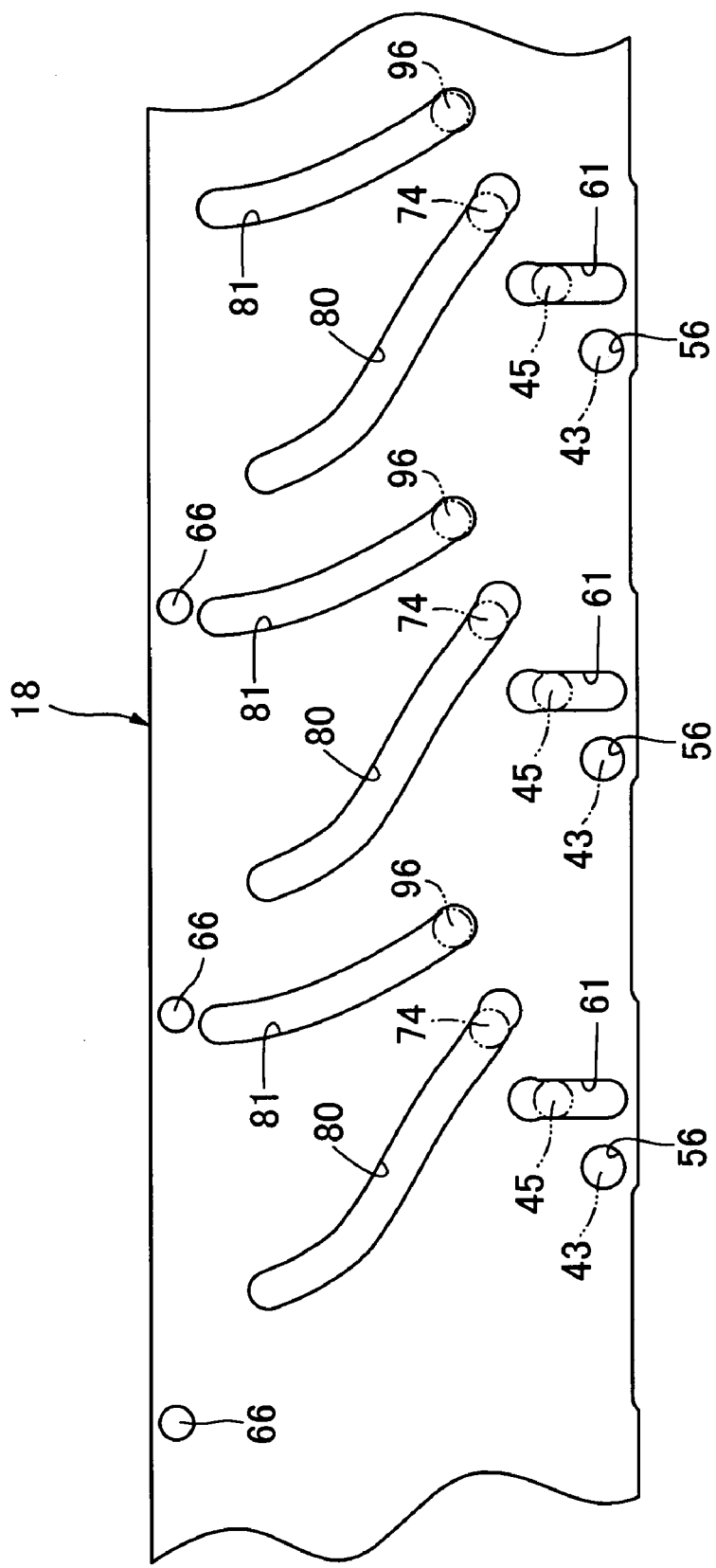
FIG. 5 is an exploded view of a linear-shuttle barrel for the embodiment of the present invention.

As can be seen in FIG. 5, the linear-shuttle barrel 18 is provided with 2nd-lens-group guiding cams 80, 2nd-lens-group focusing cams 81, and second circumferential guiding grooves 61 where the cams 80 are to fit on 2nd-lens-group guiding studs 74, the cams 81 are to fit on 2nd-lens-group focusing studs 96, and the grooves 61 are to fit on 4th-lens-group guiding studs 45. The linear-shuttle barrel 18 is further formed with bores 56 to fit on 3rd-lens-group guiding studs 43 and has 1st-lens-group studs 66.

Figure 6:
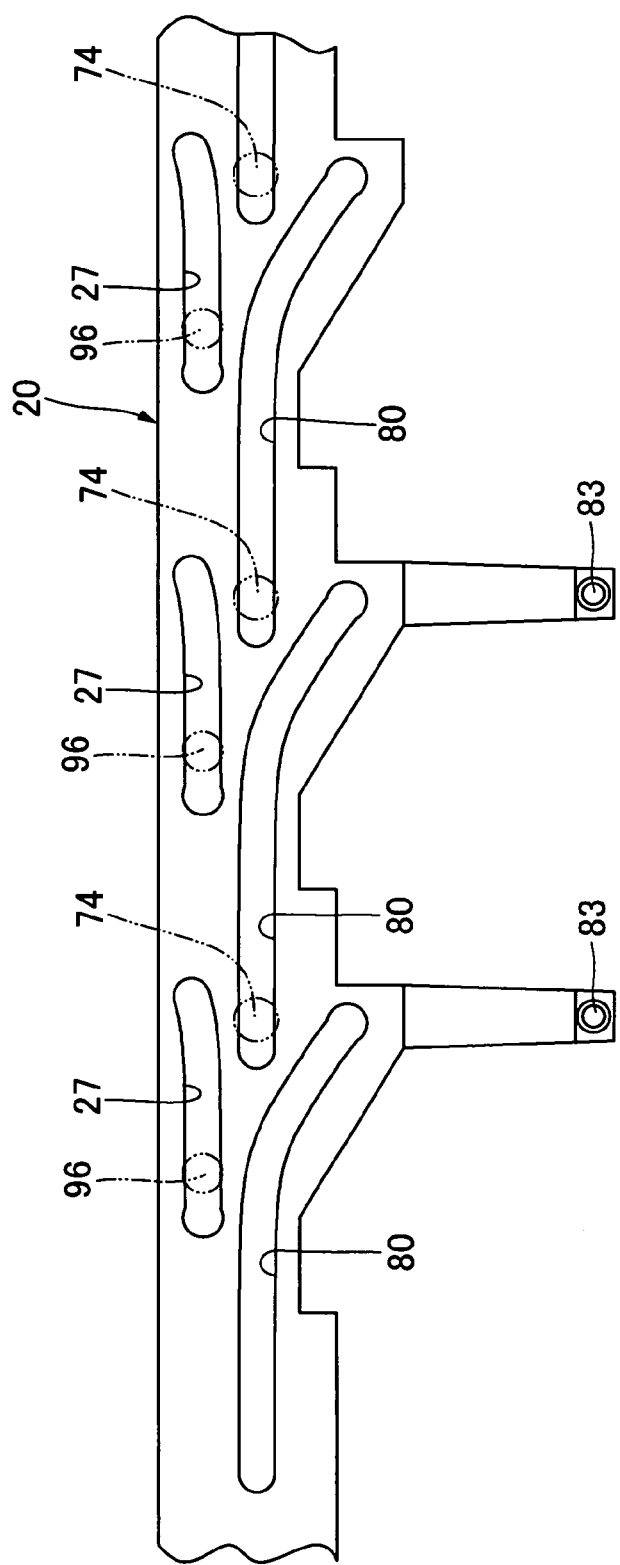
FIG. 6 is an exploded view of a focusing cam barrel for the embodiment of the present invention.

The focusing cam barrel 20 is, as shown in FIG. 6, formed with 2nd-lens-group focusing/guiding grooves 27, and 2nd-lens-group guiding cams 80, and has focusing relay studs 83 where the grooves 27 are to fit on 2nd-lens-group focusing studs 96, and the cams 80 are fit on 2nd-lens-group guiding studs 74.

Figure 7:
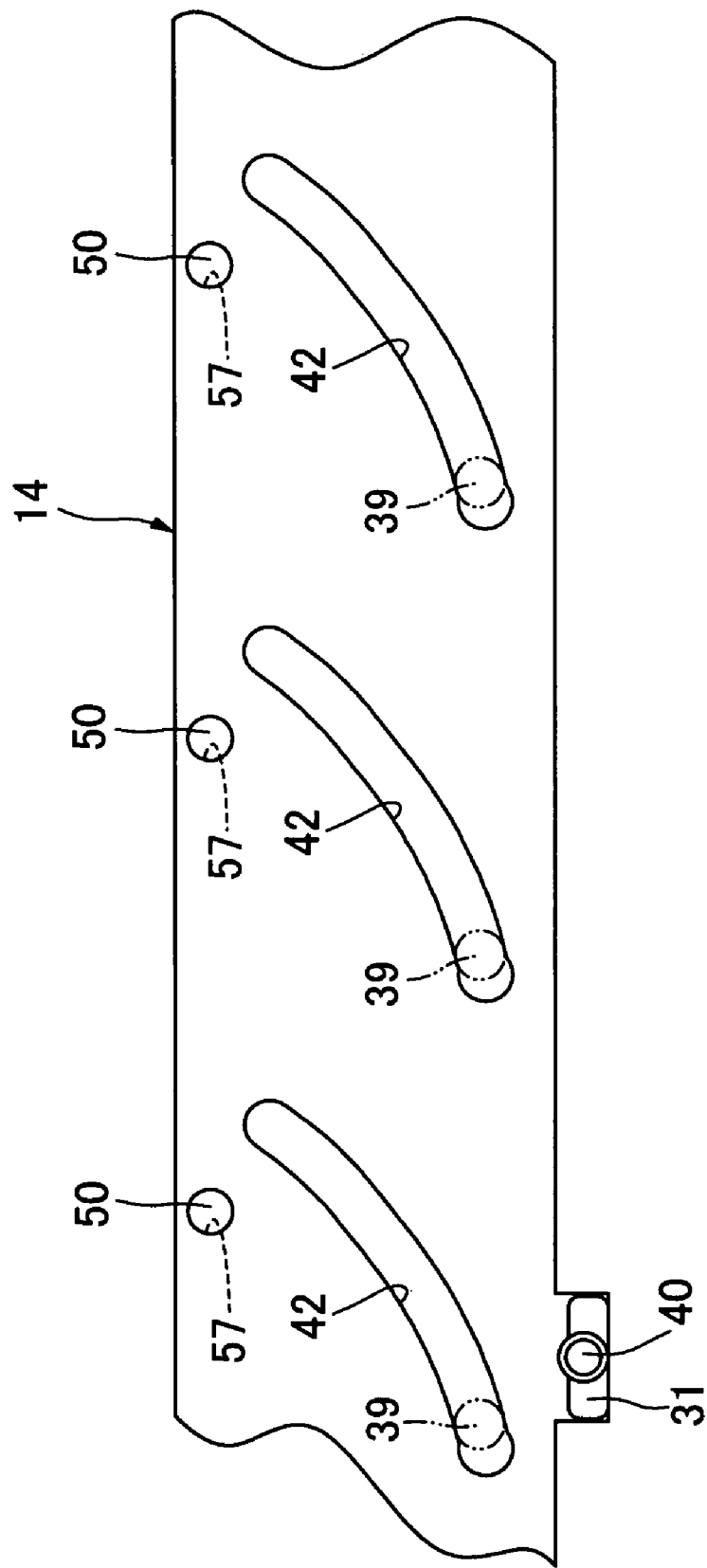
FIG. 7 is an exploded view of a zooming relay ring for the embodiment of the present invention.

As can be seen in FIG. 7, the zooming relay ring 14 is provided with zooming-relay-ring guiding cams 42 that are to fit on 1st-cam-barrel guiding studs 39 planted in the fixed barrel 12. The zooming relay ring 14 has first bores 57 that are to fit on zooming-relay-ring guiding studs 50 of the first cam barrel 16. The zooming relay ring 14 has zooming relay posts 31 protruding on the side closer to an object, which are attached to zooming relay studs 40.

Figure 8:
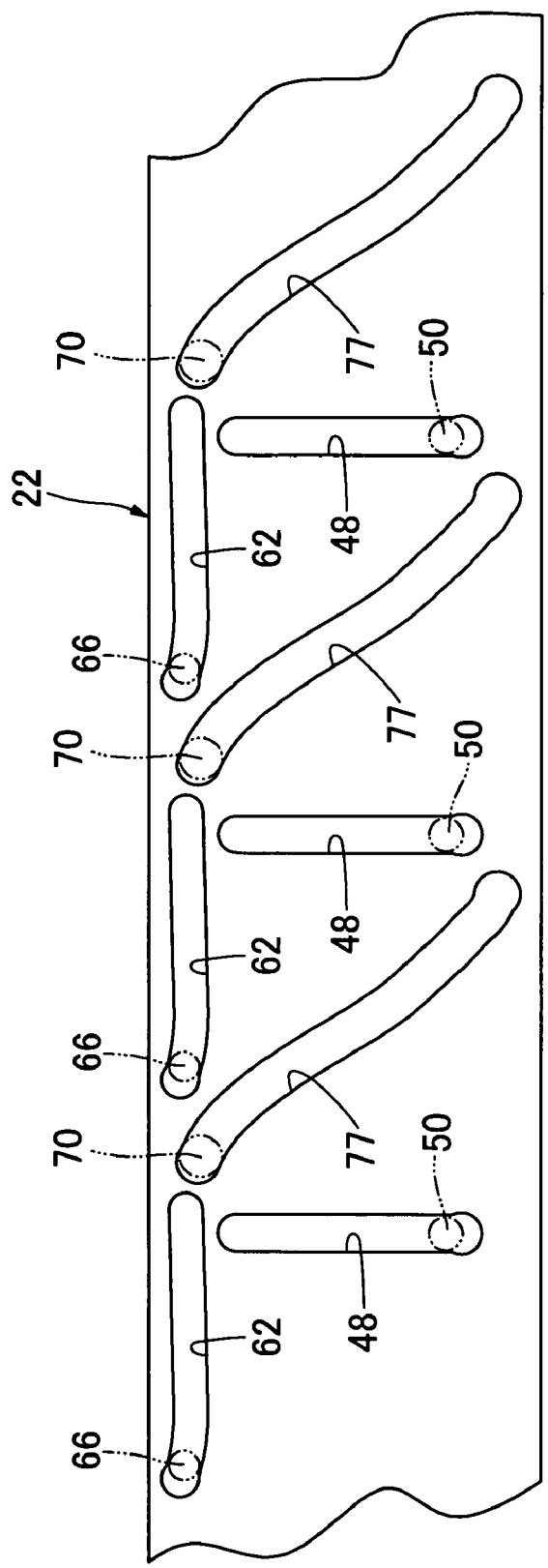
FIG. 8 is an exploded view of a second cam barrel for the embodiment of the present invention.

The second cam barrel 22 is, as shown in FIG. 8, formed with 1st-lens-group guiding cams 77, third circumferential guiding grooves 48, and horizontal guiding grooves 62 where the cams 77 are to fit on 1st-lens-group guiding studs 70, the grooves 48 are to fit on zooming-relay-ring guiding studs 50, and the grooves 62 are to fit on 1st-lens-group studs 66.

Figure 9:
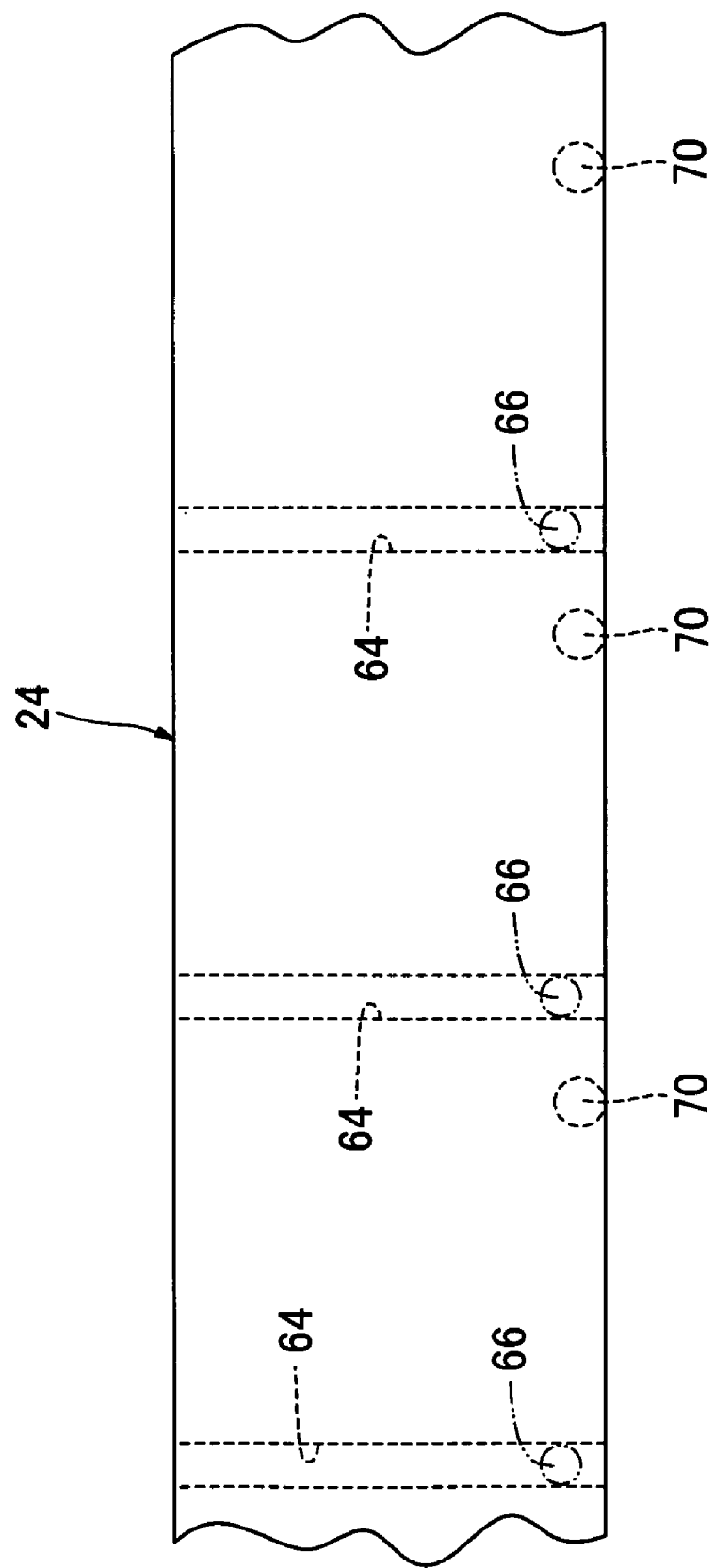
FIG. 9 is an exploded view of a 1st-lens-group sliding frame for the embodiment of the present invention.
Figure 10:
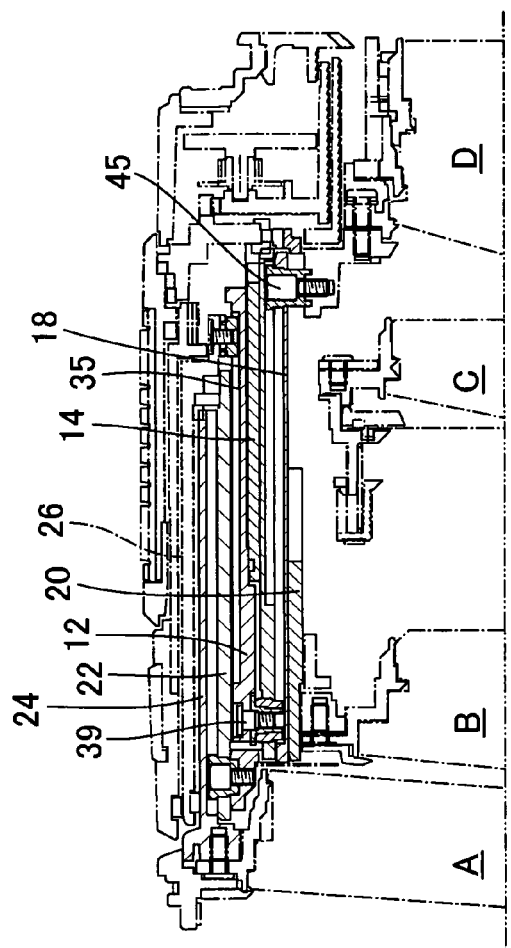
FIG. 10 is a partial cross-sectional view of a prior art inner focusing zoom lens barrel, showing the zoom lens barrel in a wide-angle view posture.
Figure 11:
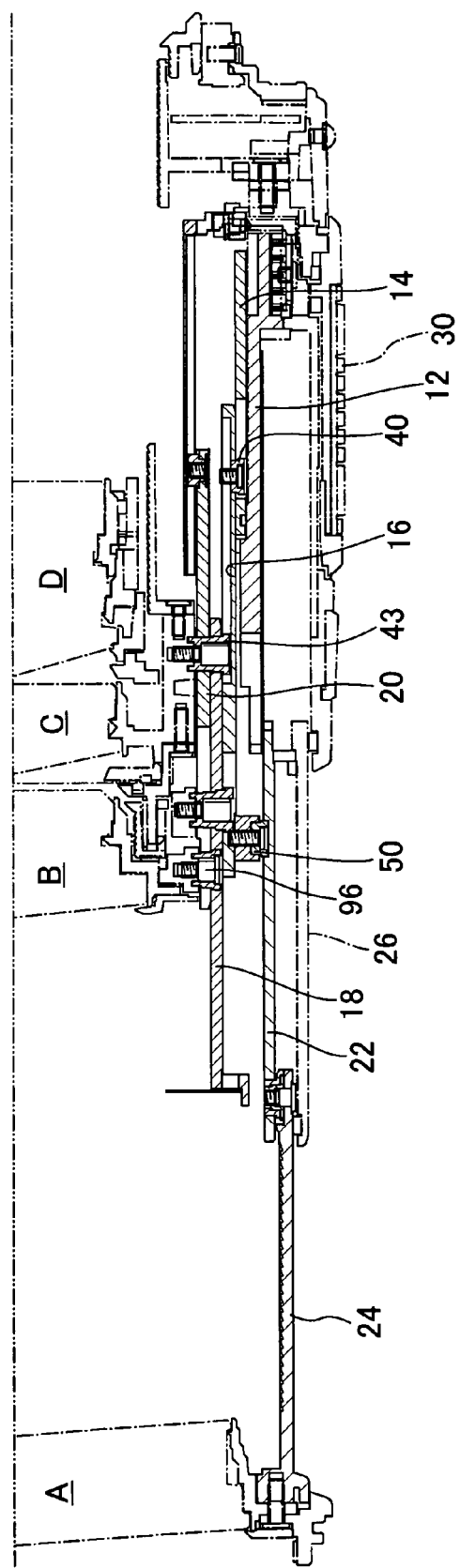
FIG. 11 is a partial cross-sectional view of the prior art inner focusing zoom lens barrel, showing the zoom lens barrel in a tele-photo view posture.

Inside the 1st-lens-group sliding frame 24, as shown in FIG. 9, provided are third circumferential guiding grooves 64 and 1st-lens-group guiding studs 70 where the grooves 64 are to fit on the 1st-lens-group studs 66, and the studs 70 are to fit in the 1st-lens-group guiding cams 77.

<Zooming>

Referring to FIG. 1 and FIG. 2, the zooming ring 30 is rotated for the zooming. Rotations of the zooming ring 30 are transmitted to the zooming relay ring 14 by the zooming relay studs 40 slidably fitted in linear grooves (not shown) in the zooming ring 30 and the zooming relay posts 31 attached thereto.

As the zooming relay ring 14 is rotated, the 1st-cam-barrel guiding studs 39 planted in the fixed barrel 12 are engaged with the 1st-cam-barrel guiding cams 42 in the zooming relay ring 14, thereby moving the zooming relay ring 14 along the optical axis and rotating the same.

The zooming-relay-ring guiding studs 50 planted in the first cam barrel 16, which extend through the first bores 57 defined in the zooming relay ring 14, are engaged with the third circumferential guiding grooves 48 in the second cam barrel 22, and this causes the rotations of the zooming relay ring 14 to be transmitted to the second cam barrel 22, thereby rotating the second cam barrel 22.

As the second cam barrel 22 is rotated, the 1st-lens-group guiding studs 66 of the linear-shuttle barrel 18 and the horizontal guiding grooves 62 in the second cam barrel 22 are engaged with one another, and this enables the second cam barrel 22 to move along the optical axis relative to the linear-shuttle barrel 18. As the second cam barrel 22 is rotated, the 1st-lens-group sliding frame 24, which has been engaged with the 1st-lens-group guiding studs 66 in the linear-shuttle barrel 18 to be inhibited from rotating, has its 1st-lens-group guiding studs 70 engaged with the 1st-lens-group guiding cams 77 in the second cam barrel 22, and this causes the 1st-lens-group sliding frame 24 to move over the second cam barrel 22 along the optical axis. In this way, the first lens group A are moved during the zooming.

The motion of the zooming relay ring 14 both linearly along and rotationally about the optical axis is transmitted to the first cam barrel 16 as a consequence of an engagement of the zooming-relay-ring guiding studs 50 in the first cam barrel 16 with the first bores 57 in the zooming relay ring 14.

Once the 3rd-lens-group guiding studs 43 in the linear-shuttle barrel 18 are fitted in the linear guiding groves 47 in the fixed barrel 12, the linear-shuttle barrel 18 can move simply along the optical axis without rotating.

When the 2nd-lens-group guiding studs 74 planted in the 2nd-lens-group sliding frame 72 are fitted simultaneously in the 2nd-lens-group guiding cams 80 of the linear-shuttle barrel 18 and the first circumferential guiding grooves 60 of the first cam barrel 16, rotating the first cam barrel 16 resultantly forces the 2nd-lens-group sliding frame 72 and the 2nd-lens-group holder 2 supported on the same to move during the zooming. The 2nd-lens-group guiding studs 74 engage the 2nd-lens-group guide cams 80 of the focusing cam barrel 20, as shown in FIG. 6, and the first circumferential guiding grooves 60 of the first cam barrel 16, as shown in FIG. 4, and thus the focusing cam barrel 20 is moved linearly along the optical axis without any rotation.

The 3rd-lens-group guiding studs 43 planted in the 3rd-lens-group holder 3, once engaged with the linear guiding grooves 47 in the fixed barrel 12, inhibit the 3rd-lens-group frame 3 from rotating. The 3rd-lens-group guiding studs 43 are fitted in the 3rd-lens-group guiding cams 44 in the first cam barrel 16, and moving the first cam barrel 16 linearly along and rotationally about the optical axis permits the 3rd-lens-group holder 3 to move for the zooming.

The 4th-lens-group guiding studs 45 planted in the 4th-lens-group holder 4, once engaged with the second circumferential guiding grooves 61 in the linear-shuttle barrel 18, inhibit the 4th-lens-group holder 4 from rotating. When the 4th-lens-group guiding studs 45 are fitted in the 4th-lens-group guiding cams 46 in the first cam barrel 16, moving the first cam barrel 16 simultaneously axially along and rotationally about the optical axis permits the 4th-lens-group holder 4 to move along the optical axis for the zooming.

<Focusing>

With reference to FIGS. 1 and 2, rotations of the focusing ring 28 are transmitted to the focusing cam barrel 20 by a focusing gear ring 94 and the focusing relay ring 23 intervening therebetween. Resultant rotations of the focusing cam barrel 20 rely on the stationary 2nd-lens-group guiding studs 74. Specifically, the focusing cam barrel 20 can be moved neither along the optical axis nor in the rotational directions till the 2nd-lens-group guiding studs 74 are engaged with the focusing cam barrel 20. Namely, the focusing cam barrel 20 can be moved along the optical axis and in the rotational directions after the 2nd-lens-group guiding studs 74 have been engaged with the focusing cam barrel 20.

The movement of the focusing ring 28 in both axial and rotational directions is a motion carried out during the focusing on the assumption that the 2nd-lens-group focusing studs 96 planted in the 2nd-lens-group holder 2 are fitted in both the 2nd-lens-group focusing/guiding grooves 27 in the focusing cam barrel 20 and the 2nd-lens-group focusing cams 81 in the linear-shuttle barrel 18.

We claim:

1. An inner focusing zoom lens barrel having a fixed barrel, first and second cam barrels, a linear-shuttle barrel, a focusing cam barrel, a zooming relay barrel, and a 1st-lens-group sliding barrel, characterized in that the first cam barrel, the linear-shuttle barrel, and the focusing cam barrel are superposed one over another in this sequence inside the fixed barrel while the zooming relay barrel, the second cam barrel, and the 1st-lens-group sliding barrel are superposed one over another in this sequence outside the fixed barrel.

2. An inner focusing zoom lens barrel according to claim 1, wherein the first cam barrel is formed with 3rd- and 4th-lens-group guiding cams, the linear-shuttle barrel is formed with 2nd-lens-group guiding cams, the zooming relay barrel is formed with 1st-cam-barrel guiding cams, the second cam barrel is formed with 1st-lens-group guiding cams, and the focusing cam barrel is formed with 2nd-lens-group focusing/guiding grooves and 2nd-lens-group guiding cams.

3. An inner focusing zoom lens barrel according to claim 1, wherein the first cam barrel, the zooming relay barrel, and the second cam barrel are moved both linearly along and rotationally about the optical axis during the zooming while the focusing cam barrel is moved linearly along the optical axis by rotation of the focusing cam barrel during the focusing.

* * * * *